US012005552B2

(12) United States Patent
Gupta

(10) Patent No.: US 12,005,552 B2
(45) Date of Patent: Jun. 11, 2024

(54) GEL HANDLE PLIERS FOR BEADING

(71) Applicant: Nikhil Gupta, Schaumburg, IL (US)

(72) Inventor: Nikhil Gupta, Schaumburg, IL (US)

(73) Assignee: DPG USA INC., Schaumburg, IL (US)

( * ) Notice: Subject to any disclaimer, the term of this patent is extended or adjusted under 35 U.S.C. 154(b) by 24 days.

(21) Appl. No.: 14/174,533

(22) Filed: Feb. 6, 2014

(65) Prior Publication Data

US 2014/0224083 A1 Aug. 14, 2014

Related U.S. Application Data

(60) Provisional application No. 61/762,454, filed on Feb. 8, 2013.

(51) Int. Cl.

*B25B 7/02* (2006.01)
*B25B 7/00* (2006.01)
*B25G 1/10* (2006.01)

(52) U.S. Cl.

CPC ................ *B25B 7/00* (2013.01); *B25G 1/102* (2013.01)

(58) Field of Classification Search

CPC .......... B25G 1/102; B25G 1/105; B25G 1/00; B25G 1/10; B25G 1/12; B25G 1/125; B25G 1/01; B25G 1/02; B25F 1/003; B25B 7/00; Y10S 16/12; Y10S 16/476; Y10T 16/476; B29L 2031/463; B26B 13/16

USPC ........... 81/300, 427.5, 177.1, 489, 9.4, 9.42, 81/9.43, 415, 417, 22; 294/16, 15, 57; 30/341, 340; 16/430, 422

See application file for complete search history.

(56) References Cited

U.S. PATENT DOCUMENTS

| | | | | | |
|---|---|---|---|---|---|
| 264,527 | A * | 9/1882 | Haley | B25G 1/105 16/421 |
| 1,330,791 | A * | 2/1920 | Dickey | B25B 7/00 16/DIG. 12 |
| 2,520,808 | A * | 8/1950 | Miller | B25G 1/12 16/431 |
| 4,044,625 | A * | 8/1977 | D'Haem et al. | 74/558.5 |
| 4,304,158 | A * | 12/1981 | Brunosson | B25G 1/12 81/417 |

(Continued)

FOREIGN PATENT DOCUMENTS

DE 102006032537 A1 * 1/2008 ............. B25G 1/105

OTHER PUBLICATIONS

Bead Smith, (2008), Professional Quality Pliers, [Brochure], Carteret, NJ, https://iws.helby.com/webimages/TL08_049-89_PlierTools-LR.pdf.*

*Primary Examiner* — Laura C Guidotti
*Assistant Examiner* — Caleb Andrew Holizna
(74) *Attorney, Agent, or Firm* — Dunlap Bennett & Ludwig, PLLC; Anna L. Kinney

(57) ABSTRACT

Beading pliers, having a pair of engageable jaws pivotable about a journal cylinder, are provided with handles. Each handle has an outwardly curving handle core surrounded by a silicone gel filled retention tube encompassed by a cover tube comprising silicone rubber having a thickness of between about 3 and about 7 mm, the end of each pliable cover tube spaced from the journal being closed. The open ends of the pliable cover tube and the retention tube are sealed by an annular collar extending round the handle core. A flexible, inwardly curving leaf spring, retained by each collar, urges the jaws out of engagement when the handles are urged together.

23 Claims, 7 Drawing Sheets

(56) References Cited

U.S. PATENT DOCUMENTS 5,253,557 A * 10/1993 Dolak ........................ B25B 7/00 16/430
5,390,572 A * 2/1995 Gakhar ................... B25B 15/02 16/430
5,659,959 A * 8/1997 Parlowski ............... B26B 13/20 16/430
D383,956 S * 9/1997 Brantley .......................... D8/52
5,713,104 A * 2/1998 Giampaolo, Jr. ...... A47G 21/08 16/110.1
5,716,303 A * 2/1998 Scatterday ....... A63B 21/00189 482/49
5,740,586 A * 4/1998 Gomas ..................... B25G 1/10 16/430
D420,886 S * 2/2000 MacIntosh ..................... D8/107
6,024,000 A * 2/2000 Goldmann, II ... B29C 66/73715 81/427.5
6,131,244 A * 10/2000 Bares ..................... B25G 1/102 16/422
6,263,770 B1 * 7/2001 Gomas .................... B26B 13/18 81/427
6,647,582 B1 * 11/2003 Rechelbacher .......... A46B 5/00 15/143.1
6,648,535 B2 * 11/2003 Ferrara, Jr. ............ B25G 1/102 16/421
6,725,505 B2 * 4/2004 Willat ..................... A47J 45/00 16/111.1
6,776,073 B1 * 8/2004 Brady ....................... B25B 7/00 81/416
6,793,426 B2 * 9/2004 Willat .................. B43K 23/004 401/6
6,835,015 B2 * 12/2004 Pearce ..................... A23G 3/36 401/6
6,968,599 B2 * 11/2005 Blauer ................... A45C 13/26 135/25.4
7,246,414 B2 * 7/2007 Wu ........................ B25G 1/102 16/430
7,797,782 B2 * 9/2010 Davis ..................... A45D 24/00 15/143.1
7,877,843 B2 * 2/2011 Holland-Letz ......... B25G 1/105 16/436
7,946,202 B2 * 5/2011 Lin ........................ B25G 1/105 81/427.5
8,650,688 B1 * 2/2014 Gasparrini ............ B25B 27/146 7/132
2003/0024543 A1 * 2/2003 Wolf ....................... B26B 13/20 132/212
2003/0110585 A1 * 6/2003 Rechelbacher .......... A46B 5/00 15/143.1
2003/0123917 A1 * 7/2003 Willat .................... A42B 3/121 401/6
2004/0205938 A1 * 10/2004 Blauer ................... A45C 13/26 16/431
2005/0097998 A1 * 5/2005 Herbst ...................... B25B 7/02 81/418
2006/0174450 A1 * 8/2006 Chen ...................... B25G 1/102 16/436
2007/0017540 A1 * 1/2007 Davis ..................... A45D 24/00 132/150
2007/0074374 A1 * 4/2007 Chen ...................... B25G 1/102 16/431
2009/0271951 A1 * 11/2009 Hao ....................... B25G 1/102 16/430

* cited by examiner

GEL HANDLE PLIERS FOR BEADING

CLAIM FOR PRIORITY

This Non-Provisional patent application is based on U.S. Provisional Patent Application Ser. No. 61/762,454, filed on Feb. 8, 2013, the priority of which is claimed, and the disclosure of which is incorporated by reference.

BACKGROUND OF THE INVENTION

Many hobbyists have taken up beading as a past time, making decorative jewelry and ornamental objects for their families and friends as well as themselves. Many of the tools used for beading are quite similar to conventional hand tools. However, conventional hand tools are not quite optimum for beading as the forces required in beading are quite low and many beaders are of advanced age and may have joint infirmities such as arthritis which should be addressed in beading tools.

SUMMARY OF THE INVENTION

The present invention relates to pliers used for beading having handles with thin metal cores surrounded by extremely soft and compliant covers filled with a viscous silicone gel to enable beaders to exert the forces required for the various operations involved in beading without undue discomfort to their hands. In the practice of the present invention, the cores of the handles will be relatively delicate, often having a generally semicircular cross-section with the flattened portion of the semi circles facing each other. For beading applications, handles having cross-sections of semicircles of less than $\frac{3}{8}$ of an inch diameter are preferred, more preferably the cross-sections of the handles will have diameters less than $\frac{5}{16}$ths of an inch, while still preferably the cross section of the handle will be between $\frac{7}{32}$ and $\frac{5}{16}$ of an inch, and most preferably between $\frac{7}{32}$ and $\frac{9}{32}$ of an inch. In contrast to the rather delicate sizing of the cores of the handles, the gel filled handles are quite robust, taking the cross-sectional form of a flattened annulus having a tough but pliable outer integument with a thickness of at least 3 mm, preferably between 3 and 5 mm, more preferably between 3 ½ and 4 ½ millimeters in thickness, encapsulating a rigid tube adapted to receive the aforementioned cores of the handles, the space between the rigid tube and the outer integument being filled with viscous silicone gel such that the thickness of the handle is at least about 13 mm, preferably at least about 14 mm, more preferably 15 mm, still more preferably between 16 and 20 mm. The outer integument thus forms a sheath open at one end having a flattened rigid tube which is also open at one end and sealed at the other, the space therebetween being filled with viscous silicone gel.

Other aspects and advantages of the present invention are described in the detailed description below and in the claims.

BRIEF DESCRIPTION OF THE DRAWINGS

The invention is described in detail below with reference to the various Figures, wherein like numerals designate similar parts. In the Figures.

DESCRIPTION OF THE PREFERRED EMBODIMENT

The invention is described in detail below with reference to several embodiments. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning.

With respect to the various ranges set forth herein, any upper limit recited may, of course, be combined with any lower limit for selected sub-ranges.

Figure 1:
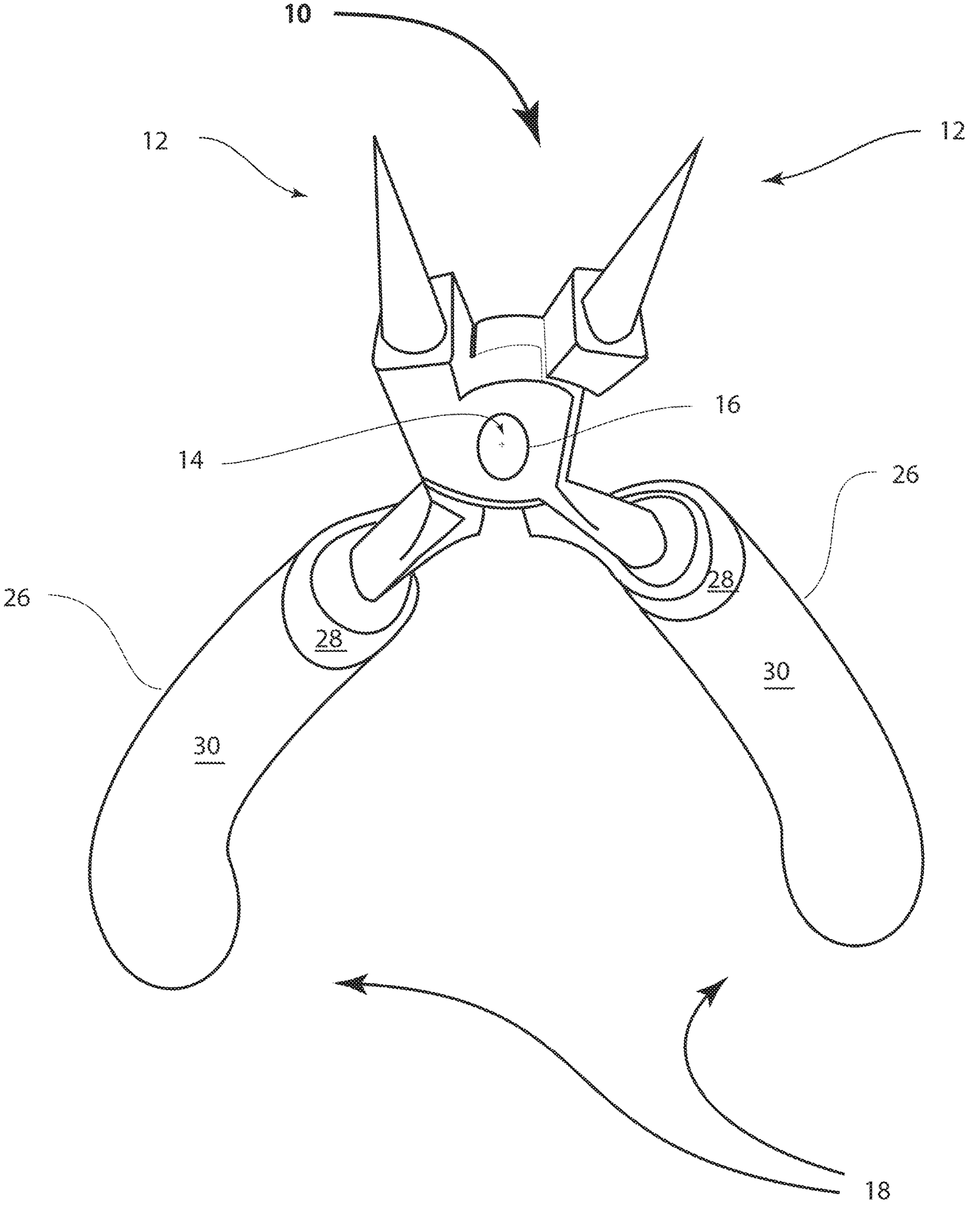
FIG. 1 is a schematic isometric perspective illustrating a pair of pliers of the present invention.
Figure 2:
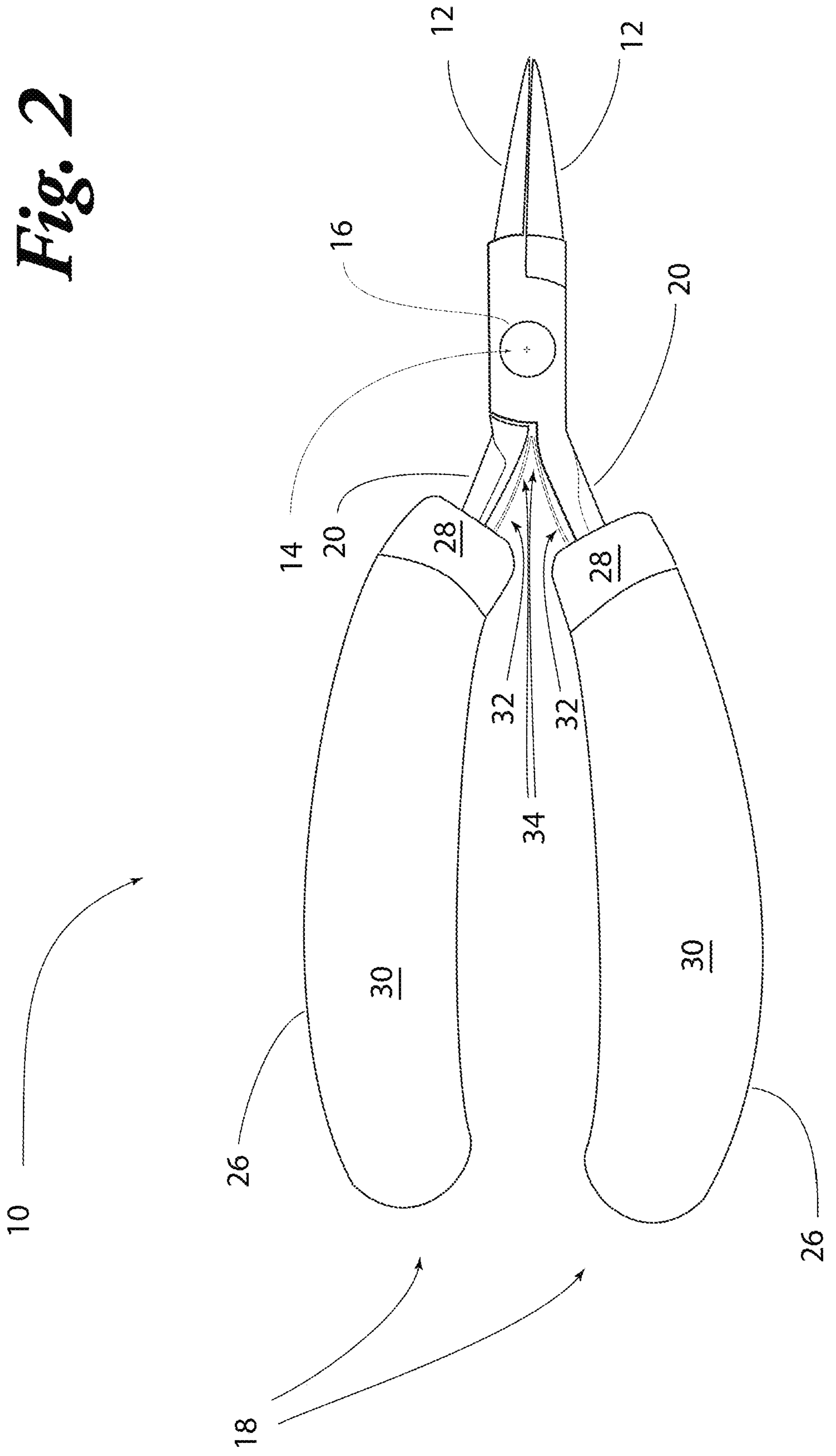
FIG. 2 is a top plan view of a pair of pliers of the present invention.
Figure 3:
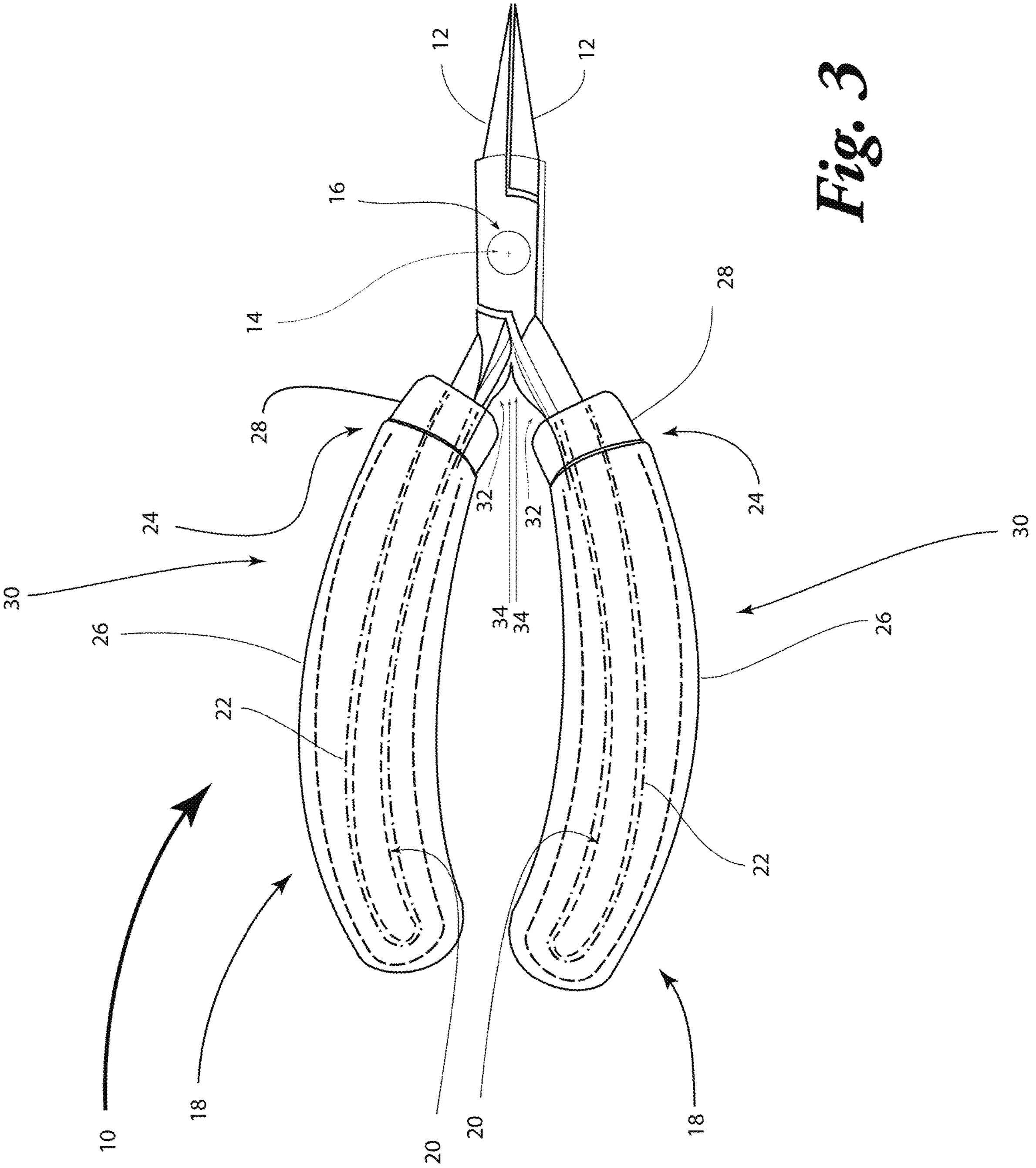
FIG. 3 is a top plan view of the pair of pliers of the present invention wherein the inner surface of the integument and the inner tube as well as the handle cores are indicated by dotted lines.
Figure 4:
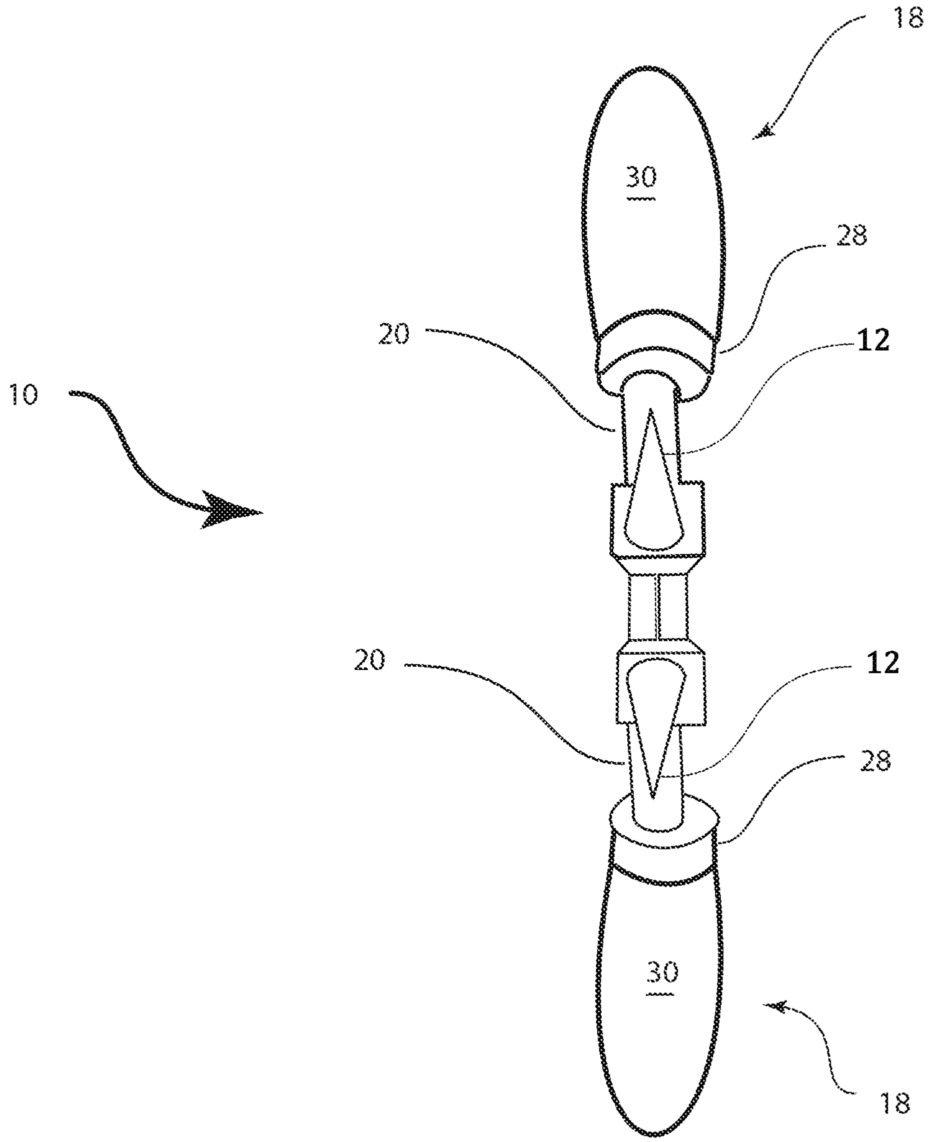
FIGS. 4 and 5 are, respectively, front and rear elevations of the gel handle pliers of the present invention.
Figure 5:
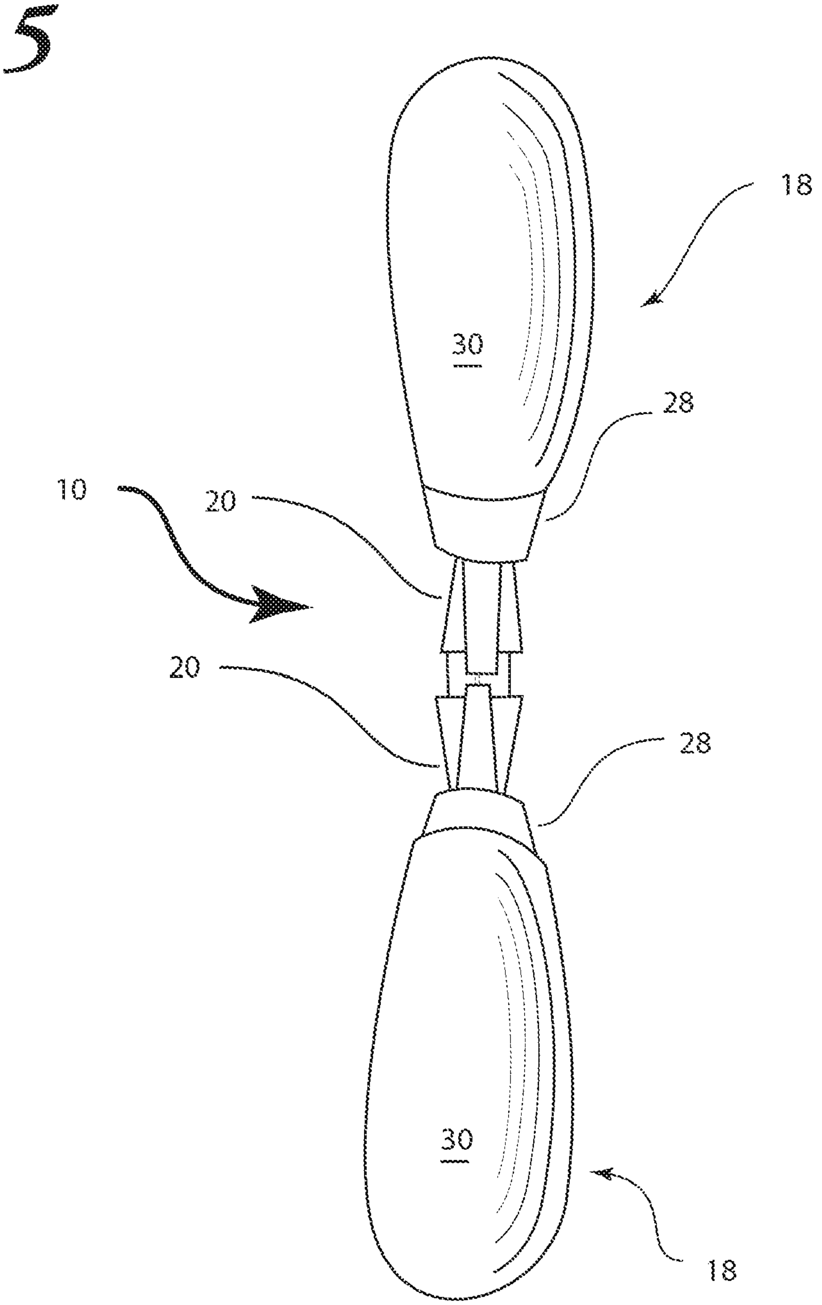
Figure 6:
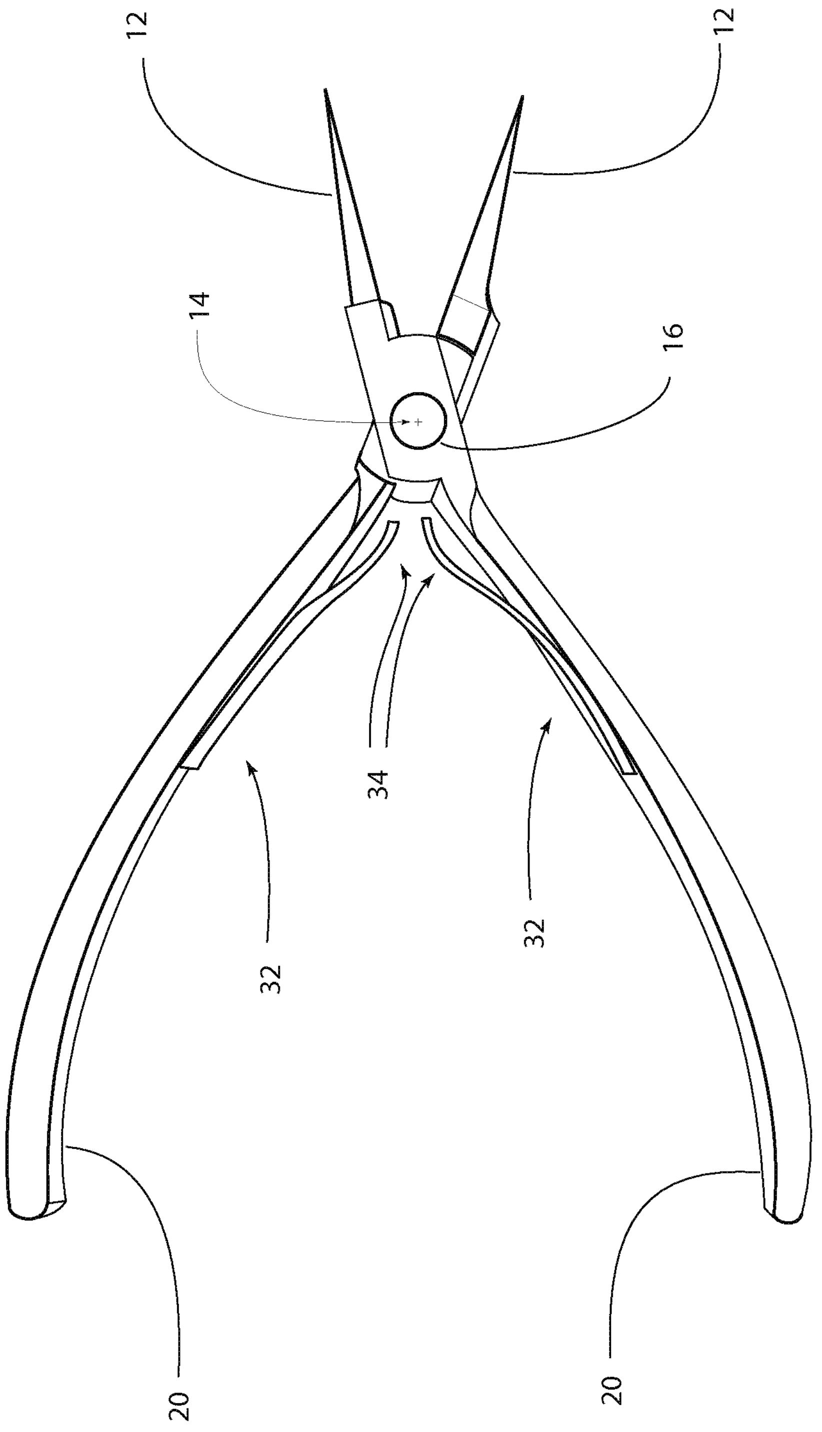
FIG. 6 is a view of the pair of pliers of the present invention with the covers removed.
Figure 7:
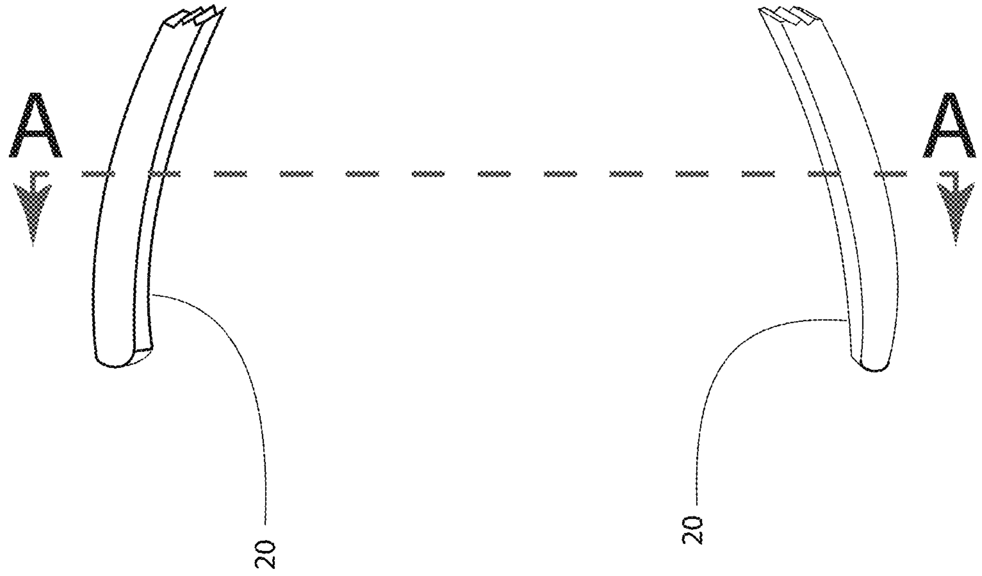
FIG. 7 is a fragmentary view of FIG. 6 indicating section lines A—A along which the views illustrated in FIGS. 8-14 were taken.
Figure 8:
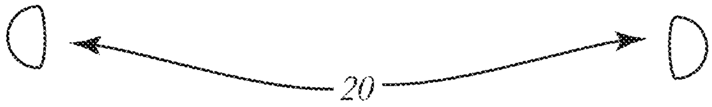
FIGS. 8-14 are sectional views taken along line A—A in FIG. 7 illustrating several of the various cross sections suitable for handle cores 20 in the pliers of the present invention.
Figure 9:
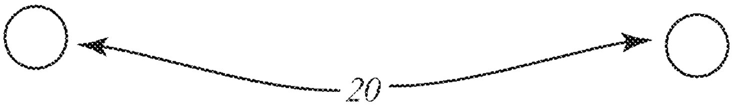
Figure 10:
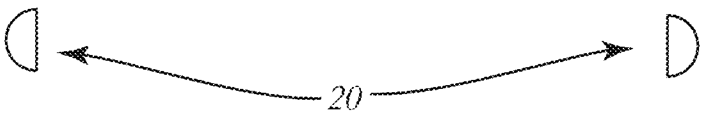
Figure 11:
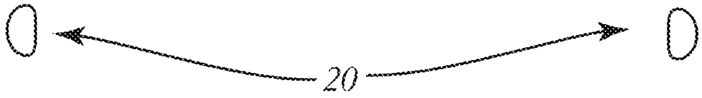
Figure 12:
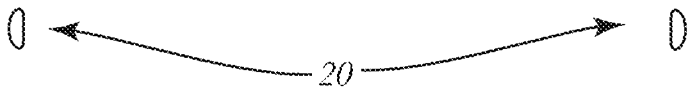
Figure 13:
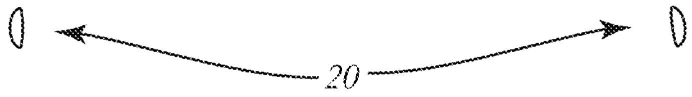
Figure 14:
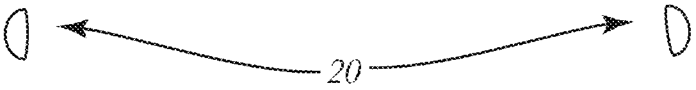

In FIG. 1, pliers 10 have jaws 12 pivotable about axis 14 of cylindrical journal 16 with outwardly curving handles 18 extending from axis 14 whereby jaws 12 can be brought into engagement by closing of handles 18 toward each other. As shown in more detail in FIG. 3, each handle has an outwardly curving semicircular core 20, surrounded by closed end retention tube 22 having retention tube mouth 24 located proximate but spaced from journal 16. Pliable cover tube 26 surrounds closed end retention tube 22 with the space therebetween being filled with viscous silicone gel. Annular collar 28 seals the space between retention tube 22 and pliable cover tube 26 while retaining pliable cover 26 and closed end retention tube 22 on handle cores 20, and thereby forming handle cushions 30 about handle cores 20. FIG. 7 is a fragmentary view of FIG. 6 indicating section lines A—A along whcih the views illustrated in FIGS. 8-14 were taken. FIGS. 8-14 are sectional views taken along line A—A in FIG. 7 illustrating several of the various cross sections suitable for handle cores 20 in the pliers of the present invention. Inwardly curving leaf springs 32 are retained against handle cores 20 by annular collars 28 extending therefrom towards journal 16 with distal ends 34 being engagable against each other when handles 18 are urged together to close jaws 12 so that inwardly curving leaf springs 32 lightly urge handles outwardly to facilitate opening of jaws 12. Pliable cover tube 26 is desirably formed from silicone rubber and has a thickness of between about 3 and about 6 mm, more preferably between about 3.5 and 5.5 mm, more preferably between about 3.5 and 5 mm. The space between retention tube 22 and pliable cover tube 26 is filled with viscous silicone gel such that the width of the gel-filled cover is at least or about 13 mm, preferably at least 14 mm, more preferably at least 15 mm and most preferably between 15 and 20 mm. It has been found that these highly cushioned gel filled covers are greatly preferred by beaders of advanced ages over pliers having handles that are conventionally covered.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

Additional representative embodiments of the present teachings include, but are not limited to:

Embodiment 1. Beading pliers having a pair of engageable jaws pivotable about a journal cylinder, each jaw being integrally connected to an outwardly curving handle core, each said handle core having a cross-sectional form ranging between circular and semicircular and being surrounded by a retention tube closed at one end spaced from said journal cylinder and open at an end proximate to the space from said journal cylinder, each said retention tube being encompassed by an open ended pliable cover tube comprising silicone rubber having a thickness of between about 3 and about 7 mm, the open end of said pliable cover tube being adjacent the open end of said retention tube, the end of said pliable cover tube spaced from said journal being closed, the open ends of said pliable cover tube and said retention tube being sealed by annular collar extending round said handle core, a flexible inwardly curving leaf spring being retained by each said collar, said flexible inwardly curving leaf spring urging said jaws out of engagement when said handles are urged together.

Embodiment 2. The beading pliers of embodiment 1, wherein the cross-section of each said handle core is a flattened circle having a diameter between about 3⁄16 and 7⁄16 inch.

Embodiment 3. The beading pliers of embodiment 1, wherein the width of the gel filled covers on each handle is at least 12.5 mm.

Embodiment 4. The beading pliers of embodiment 2, wherein the width of the gel filled covers on each handle is at least 12.5 mm.

Embodiment 5. The beading pliers of embodiment 2, wherein each open ended pliable cover tube comprises silicone rubber having a thickness of between about 3.25 and about 6.5 mm.

Embodiment 6. The beading pliers of embodiment 2, wherein each open ended pliable cover tube comprises silicone rubber having a thickness of between about 3.5 and about 6 mm.

Embodiment 7. The beading pliers of embodiment 2, wherein each open ended pliable cover tube comprises silicone rubber having a thickness of between about 3.75 and about 5.5 mm.

Embodiment 8. The beading pliers of embodiment 3, wherein each open ended pliable cover tube comprises silicone rubber having a thickness of between about 3.25 and about 6.5 mm.

Embodiment 9. The beading pliers of embodiment 3, wherein each open ended pliable cover tube comprises silicone rubber having a thickness of between about 3.5 and about 6 mm. Embodiment 10. The beading pliers of embodiment 3, wherein each open ended pliable cover tube comprises silicone rubber having a thickness of between about 3.75 and about 5.5 mm.

Embodiment 11. The beading pliers of embodiment 10, wherein the cross-section of each said handle core is a flattened circle having a diameter between about 7⁄32 and 13⁄32 inch.

Embodiment 12. The beading pliers of embodiment 10, wherein the cross-section of each said handle core is a flattened circle having a diameter between about 15⁄64 and 25⁄64 inch.

Embodiment 13. The beading pliers of embodiment 10, wherein the width of the gel filled covers on each handle is at least 13 mm.

Embodiment 14. The beading pliers of embodiment 10, wherein the width of the gel filled covers on each handle is at least 14 mm.

Embodiment 15. The beading pliers of embodiment 10, wherein the width of the gel filled covers on each handle is between 15 and 20 mm.

Embodiment 16. The beading pliers of embodiment 1, wherein the cross-section of each said handle core is a flattened circle having a diameter between about 7⁄32 and 13⁄32 inch.

Embodiment 17. The beading pliers of embodiment 1, wherein the cross-section of each said handle core is a flattened circle having a diameter between about 15⁄64 and 25⁄64 inch.

Embodiment 18. The beading pliers of embodiment 1, wherein the width of the gel filled covers on each handle is at least 13 mm.

Embodiment 19. The beading pliers of embodiment 1, wherein the width of the gel filled covers on each handle is at least 14 mm.

Embodiment 20. The beading pliers of embodiment 1, wherein the width of the gel filled covers on each handle is between 15 and 20 mm.

Embodiment 21. Beading pliers having a pair of engageable jaws pivotable about a journal cylinder, each jaw being integrally connected to an outwardly curving handle core, each said handle core having a cross-sectional form ranging between circular and semicircular and being surrounded by a retention tube closed at one end spaced from said journal cylinder and open at an end proximate to the space from said journal cylinder, each said retention tube being encompassed by an open ended pliable cover tube comprising silicone rubber having a thickness between about 3 ¾ and 5 ½ mm, the open end of said pliable cover tube being adjacent the open end of said retention tube, the end of said pliable cover tube space from said journal being closed, the open ends of said pliable cover tube and said retention tube being sealed by annular collar extending round said handle core, a flexible inwardly curving leaf spring being retained by each said collar, said flexible inwardly curving leaf springs urging said jaws out of engagement when said handles are urged together; wherein the cross-section of each said handle core is a flattened circle having a diameter of between about 15⁄64 and 25⁄64 inch and wherein the width of the gel filled covers on each handle is between 15 and 20 mm.

Embodiment 22. Beading pliers having a pair of engageable jaws pivotable about a journal cylinder, each jaw being integrally connected to an outwardly curving handle core, each said handle core having a cross-sectional form ranging between circular and semicircular and being surrounded by a retention tube closed at one end spaced from said journal cylinder and open at an end proximate to the space from said journal cylinder, each said retention tube being encompassed by an open ended pliable cover tube comprising silicone rubber having a thickness of between about 3 ½ and 6 mm, the open end of said pliable cover tube being adjacent the open end of said retention tube, the end of said pliable cover tube space from said journal being closed, the open ends of said pliable cover tube and said retention tube being sealed by annular collar extending round said handle core, a flexible inwardly curving leaf spring being retained by each said collar, said flexible inwardly curving leaf springs urging said jaws out of engagement when said handles are urged together; wherein the cross-section of each said handle core is a flattened circle having a diameter of between about 7⁄32 and 13⁄32 inch; and wherein the width of the gel filled covers on each handle is at least 14 mm.

Embodiment 23. The beading pliers of embodiment 22, wherein the width of the gel filled covers on each handle is between 15 and 20 mm.

Embodiment 24. The beading pliers of embodiment 23, wherein the cross-section of each said handle core is a flattened circle having a diameter between about 15⁄64 and 25⁄64 inch.

Embodiment 25. The beading pliers of embodiment 22, wherein the cross-section of each said handle core is a flattened circle having a diameter between about 15⁄64 and 25⁄64 inch.

What is claimed is:

1. Beading pliers comprising:

- a pair of engageable jaws pivotable about a journal, each jaw being integrally connected to an outwardly curving handle core, each said handle core having a semicircular cross section with a flat portion, wherein the flat portion of the semi-circles face each other, wherein each said handle core terminating at a handle core end spaced from said journal;
- a retention tube surrounding each said handle core, each said retention tube being closed around the handle core end, following a curve of the handle core, and being open at an end proximate said journal;
- an open ended pliable cover tube comprising silicone rubber encompassing each said retention tube, the open end of each said pliable cover tube being adjacent the open end of said retention tube, the end of each said pliable cover tube spaced from said journal being closed;
- an annular collar extending around said handle core and the open ends of said pliable cover tube and said retention tube, wherein the annular collar seals the open ends of said pliable cover tube and said retention tube;
- viscous silicone gel being disposed in the space between each said retention tube and each said pliable cover tube; and
- a flexible inwardly curving leaf spring being retained against each said handle core by each said annular collar, said flexible inwardly curving leaf spring urging said jaws out of engagement when said handles are urged together;
- wherein each said annular collar is operative to retain the respective pliable cover tube and the respective retention tube on the respective handle core;
- wherein the open end of each retention tube terminates within the respective annular collar adjacent to the respective flexible inwardly curving leaf spring; and wherein each handle core has a diameter between about 3⁄16 inch and about 7⁄16 inch, the open-ended pliable cover tube on each handle core has a thickness of about 3 mm to about 7 mm, and the open-ended pliable cover tube on each handle core has a width of at least 12.5 mm.

2. The beading pliers of claim 1, wherein said viscous silicone gel substantially fills the space between said retention tube and said cover tube.

3. The beading pliers of claim 2, wherein each open ended pliable cover tube comprises silicone rubber having a thickness of between about 3.25 and about 6.5 mm.

4. The beading pliers of claim 2, wherein each open ended pliable cover tube comprises silicone rubber having a thickness of between about 3.5 and about 6 mm.

5. The beading pliers of claim 2, wherein each open ended pliable cover tube comprises silicone rubber having a thickness of between about 3.75 and about 5.5 mm.

6. The beading pliers of claim 1, wherein each open ended pliable cover tube comprises silicone rubber having a thickness of between about 3.25 and about 6.5 mm.

7. The beading pliers of claim 1, wherein each open ended pliable cover tube comprises silicone rubber having a thickness of between about 3.5 and about 6 mm.

8. The beading pliers of claim 1, wherein each open ended pliable cover tube comprises silicone rubber having a thickness of between about 3.75 and about 5.5 mm.

9. The beading pliers of claim 8, wherein the cross-section of each said handle core has a diameter between about 7⁄32 and 13⁄32 inch.

10. The beading pliers of claim 8, wherein the cross-section of each said handle core has a diameter between about 15⁄64 and 25⁄64 inch.

11. The beading pliers of claim 8, wherein the width of the cover tube on each handle is at least 13 mm.

12. The beading pliers of claim 8, wherein the width of the cover tube on each handle is at least 14 mm.

13. The beading pliers of claim 8, wherein the width of the cover tube on each handle is between 15 and 20 mm.

14. The beading pliers of claim 1, wherein the cross-section of each said handle core has a diameter between about 7⁄32 and 13⁄32 inch.

15. The beading pliers of claim 1, wherein the cross-section of each said handle core has a diameter between about 15⁄64 and 25⁄64 inch.

16. The beading pliers of claim 1, wherein the width of the cover tube on each handle is at least 13 mm and said viscous silicone gel substantially fills the space between said retention tube and said cover tube.

17. The beading pliers of claim 1, wherein the width of the cover tube on each handle is at least 14 mm and said viscous silicone gel substantially fills the space between said retention tube and said cover tube.

18. The beading pliers of claim 1, wherein the width of the cover tube on each handle is between 15 and 20 mm and said viscous silicone gel substantially fills the space between said retention tube and said cover tube.

19. The beading pliers of claim 1, wherein the closed end of the retention tube is spaced from said journal; the space between said retention tube and said cover tube is filled with the viscous silicone gel; the cross-section of each said handle core has a diameter of between about 15⁄64 and 25⁄64 inch;

- and the width of the cover tube on each handle is between 15 and 20 mm.

20. The beading pliers of claim 1, wherein the journal is a cylinder;

- the viscous silicone gel substantially fills the space between said retention tube and said cover tube;
- the cross-section of each said handle core has a diameter of between about 7⁄32 and 13⁄32 inch; and the width of the cover tube on each handle is at least 14 mm.

21. The beading pliers of claim 20, wherein the width of the cover tube on each handle is between 15 and 20 mm.

22. The beading pliers of claim 21, wherein the cross-section of each said handle core has a diameter between about 15/64 and 25/64 inch.

23. The beading pliers of claim 20, wherein the cross-section of each said handle core has a diameter between about 15/64 and 25/64 inch.

* * * * *